US007620986B1

(12) United States Patent
Jagannathan et al.

(10) Patent No.: US 7,620,986 B1
(45) Date of Patent: Nov. 17, 2009

(54) DEFENSES AGAINST SOFTWARE ATTACKS IN DISTRIBUTED COMPUTING ENVIRONMENTS

(75) Inventors: Jagan Jagannathan, Sunnyvale, CA (US); Rangaswamy Vasudevan, Los Altos Hills, CA (US)

(73) Assignee: Xangati, Inc., Cupertino, CA (US)

( * ) Notice: Subject to any disclaimer, the term of this patent is extended or adjusted under 35 U.S.C. 154(b) by 925 days.

(21) Appl. No.: 11/153,217

(22) Filed: Jun. 14, 2005

Related U.S. Application Data

(60) Provisional application No. 60/579,380, filed on Jun. 14, 2004.

(51) Int. Cl.
*G06F 11/00* (2006.01)
*G06F 9/00* (2006.01)
*H04L 29/06* (2006.01)

(52) U.S. Cl. ........................... 726/22; 726/11; 713/150

(58) Field of Classification Search .................. 726/22, 726/11; 713/150
See application file for complete search history.

(56) References Cited

U.S. PATENT DOCUMENTS 5,128,871 A 7/1992 Schmitz
5,233,604 A 8/1993 Ahmadi et al.
5,442,750 A 8/1995 Harriman, Jr. et al.
5,970,064 A 10/1999 Clark et al.
6,115,745 A 9/2000 Berstis et al.
6,167,025 A 12/2000 Hsing et al.
6,202,084 B1 3/2001 Kumar et al.
6,314,093 B1 11/2001 Mann et al.
6,314,464 B1 11/2001 Murata et al.
6,347,339 B1 2/2002 Morris et al.
6,816,910 B1 11/2004 Ricciulli
6,990,591 B1 * 1/2006 Pearson ....................... 726/22
7,007,301 B2 * 2/2006 Crosbie et al. ................ 726/23
7,089,428 B2 * 8/2006 Farley et al. .................. 726/22
7,260,840 B2 * 8/2007 Swander et al. ............... 726/13
7,386,888 B2 * 6/2008 Liang et al. .................... 726/23
7,409,714 B2 * 8/2008 Gupta et al. .................. 726/23
7,461,403 B1 * 12/2008 Libenzi et al. ................ 726/24
2004/0054925 A1 * 3/2004 Etheridge et al. ........... 713/201
2005/0278779 A1 * 12/2005 Koppol et al. ................ 726/22

OTHER PUBLICATIONS

Deering et al. "RFC1883," Internet Protocol, ver. 6 (IPv6) Specification, Dec. 1995, pp. 1-27, http://www.faqs.org/rfcs/rfc1883.html.
Steinke. "IP Addresses and Subnet Masks," Network Magazine, Oct. 1995, pp. 1-3, Table 1, Table 3, http://www.networkmagazine.com/shared/article/showArticle.jhtml?articleId=17601068.

* cited by examiner

*Primary Examiner*—Matthew B Smithers
*Assistant Examiner*—Techane J Gergiso
(74) *Attorney, Agent, or Firm*—Swernofsky Law Group PC

(57) ABSTRACT

The invention provides apparatus and methods for defending against attacks in a distributed computing environment, including (1) distinguishing attack traffic patterns from legitimate traffic patterns, (2) responsive to nature of message patterns; (3) attack traffic has few origination points, and does not divide further from target device; (4) detectors of illegitimate traffic can cooperate to confirm the suspected attack, with the effect of providing more information to each other.

11 Claims, 2 Drawing Sheets

LEGIT SOURCE 130
111
132
LEGIT SOURCE 130
ATTACK SOURCE 140
ATTACK SOURCE 140
142
150
150
150
112
160
160
160
110
160
160
150
131
LEGIT SOURCE 130
141
100
ATTACK SOURCE 140
TARGET DEVICE 120
121
PROTECTED PERIMETER
170

DEFENSES AGAINST SOFTWARE ATTACKS IN DISTRIBUTED COMPUTING ENVIRONMENTS

CROSS REFERENCE TO RELATED APPLICATION

This application claims priority from U.S. Provisional Application No. 60/579,380 filed Jun. 14, 2004, titled "Defenses Against Software Attacks in Distributed Computing Environments." This provisional application is hereby incorporated by reference as if fully set forth herein.

BACKGROUND OF THE INVENTION

1. Field of the Invention

The invention relates to defenses against software attacks in distributed computing environments; examples might include (a) attacks from distributed locations, authentic or "spoofed," and (b) attacks from within an environment intended to be maintained secure.

2. Related Art

Organizations that are coupled to a distributed computing environment, such as for example, the Internet, or an intranet, are subject to attacks from hostile devices or software coupled to that same distributed computing environment.

Possible Attacks (1) A first set of possible attacks include DOS (denial of service) attacks, in which one or more hostile devices or software attempt to prevent the target from being able to service legitimate network traffic. The targeted device (or a device along the way to the target device, such as a network router, switch, firewall, load balancer, or the like) is prevented from being able to service legitimate network traffic because it becomes overloaded—reviewing and discarding spoofed request messages, which have no real interest in actually obtaining the offered service. This can cause denial, disruption, or slowing of service; corruption or deletion of data; or otherwise interfere with productive activities. Where the attacked device is important for providing a critical service, the interference with that critical service can cause serious damage.

When a single hostile device attacks the target, the attacker typically spoofs its origin address, so that the attacker cannot determine from where the traffic originates, and thus cannot easily distinguish attack traffic from legitimate traffic.

Alternatively, a single hostile device might take control of multiple insecure devices, sometimes known as "zombie attackers", and direct those zombie attackers to make the DOS attack on its behalf. It is also common for the multiple zombie attackers to spoof their origin addresses.

(2) A second set of possible attacks also include "worm" attacks, in which hostile software attempts to propagate itself to multiple targets, and from each of those targets, to continue to spread, much like a biological infection. The speed of worm propagation is important. For example, a worm that moves slowly would not manifest itself by elevated traffic whereas a fast moving worm (or a "zero-day worm," that is, a worm in operation before it is discovered and a defense developed to it) is likely to exhibit elevated traffic in its attempts to self-propagate.

In their simplest form, "worm" attacks effectively create a distributed DOS attack, because the resources of the infected devices are hijacked into propagating the worm, rather than doing the productive work they were originally intended to perform. Many-to-one attacks (like the multi-zombie based attacks described above) are distinct from the one-to-many attacks that characterize each phase of a worm's propagation. In one case, a single victim is attacked by multiple points, whereas in the other case, a single attacker attempts to "infect" multiple points. Spoofing can be used in both instances to obfuscate the identity of the attacker.

In more malicious forms, "worm" attacks might directly attempt to corrupt or delete data, or to send information back to the worm's originator, in an effort to degrade the computing resources or intellectual property of the attacked device. Some "worm" attacks are also known to be pre-set to perform their damage on the occurrence of a selected condition, such as at say, 11:38 p.m., Jan. 13, 2006, or some other malicious date and time.

Once having penetrated security of an enterprise network, a "worm" attack can continue to spread within that enterprise network, even after many of its copies have been rooted out and deleted. Moreover, that "worm" attack can use the resources of the enterprise network to attack other target devices outside the enterprise network.

(3) A third set of possible attacks include "spam" attacks, in which a relatively large number of messages that are unsolicited and unwanted, are distributed to receiving users throughout the network. This is an example of an outside-in one-tomany attack whereby a single payload (such as for example a spam email) is dispersed to multiple destination points (email recipients) while the identity of the originating point (sender) might be spoofed.

Spam attacks are often difficult to distinguish from legitimate traffic because they might require a human user to read the message to make the distinction. For example, spam attacks might be difficult to distinguish from newsletters or from advertising material the recipient is actually interested in. The danger of a false positive error (marking legitimate traffic as spam) is sometimes considered too risky to aggressively remove spam traffic.

In such cases, the additional burden on the attacked device (for processing the spam traffic) and on its human users (for reading the spam traffic) can impose substantial financial costs.

Known Solutions

Known solutions attempt to distinguish attack traffic from legitimate traffic.

(1) One known solution is to interpose a security device between the target device and the rest of the network.

However, it might be difficult for the security device to make the distinction between attack traffic and legitimate traffic near the target device, especially when the attack traffic uses spoofed addresses whose actual origination cannot be inferred near the destination.

Moreover, interposing the security device does not entirely eliminate collateral damage to the network, such as in the form of increased load. And a relatively large attack directed at a relatively weak security device might cause that security device to fail entirely.

(2) A second known solution is to interpose security devices throughout a local network. However, this approach generally limits the multiple devices to a local 6 network, and generally limits the architecture of the system to multiple collectors and single controllers.

However, similar to using a single security device, it might be difficult for multiple security devices to make the distinction between attack traffic and legitimate traffic.

Moreover, due to the relatively larger size of networks using multiple security devices, it might occur that the relatively large amount of network traffic would cause only relatively large attacks to be noticed. And due to the relatively larger size of those networks, each security device might have relatively little in the way of resources (such as for example, communication bandwidth, computing power, or memory), to devote to distinguishing between attack traffic and legitimate traffic.

Accordingly, it would be advantageous to provide a technique for defending against software attacks that is not subject to drawbacks of the known art.

SUMMARY OF THE INVENTION

The invention provides apparatus and methods for defending against attacks in a distributed computing environment. In preferred embodiments, these apparatus and methods might include one or more of (1) distinguishing attack traffic patterns 6 from legitimate traffic patterns, (2) filtering or otherwise blocking attack traffic, adaptively in response to one or more detected attack patterns.

In preferred embodiments, the attack message traffic is distinguished from legitimate message traffic, responsive to one more factors of a possibly large set of such factors.

(1) For a first example, message traffic might be recognized as attack message traffic when it has only a few origination points, and especially when those few or origination points are unusual as determined by the source addresses in the individual messages in that message traffic.

(2) For a second example, message traffic might be recognized as attack message traffic when it has a relatively large number of origination points, but all of the message traffic is substantially identical.

In preferred embodiments, it is possible to distinguish between a number of different possible attack patterns.

(1) These might be distinguished by whether the attack traffic is initiated from outside of a protected perimeter, such as for example an enterprise network, or a subdivision thereof such as an individual LAN within that enterprise network.

(2) These might also be distinguished by whether the attack traffic is "many to one", that is, many sources sending attack messages to a single target, or whether the attack traffic is "one to many", that is, one source sending attack messages to multiple targets.

These two distinctions produce at least four possible applications.

- In a general case, all types of attack message traffic, whether many to one or one to many, and whether initiated from inside a defended perimeter or whether initiated from outside the defended perimeter, are distinguished from legitimate message traffic.
- In a "DDOS" (distributed denial of service) case, messages in the attack traffic come from many sources outside a defended perimeter, in an attempt to overload the target device. It sometimes occurs that the target device has some defensive device, such as a firewall or other filter, in the path of that attack traffic, with the effect that the messages in the attack traffic overload the defensive device rather than the target device. Either way, the target device is rendered unable to respond to incoming requests for service.
- In a "worm" case, messages in the attack traffic are generated by a single source, but that single source is already within the defended perimeter, with the effect that the enterprise network, or subdivision thereof such as an individual LAN within that enterprise network, becomes overloaded with copies of the "worm" messages, and devices coupled to that network become overloaded with receiving (and possibly being infected by) the "worm" message.
- In a "spam" case, messages in the attack traffic are generated by a single source, and that single source is outside the defended perimeter. However, spam messages are difficult to distinguish from otherwise legitimate traffic, because it is often common, and even welcome, for a single source to generate multiple copies of an identical message for receipt by multiple recipients.

Techniques are described herein by which legitimate message traffic is distinguished from attack message traffic, in response to relatively simple features of the message traffic and heuristics applied to that message traffic. For example, two such features, as described herein, include (1) whether the message traffic originates from a single source or not, and (2) whether the messages in the message traffic have their origin information spoofed to indicate false origination devices.

After reading this application, those skilled in the art would recognize that the techniques described herein provide an enabling technology, with the effect that heretofore advantageous features can be provided that heretofore were substantially infeasible.

DETAILED DESCRIPTION OF THE PREFERRED EMBODIMENT

Figure 1:
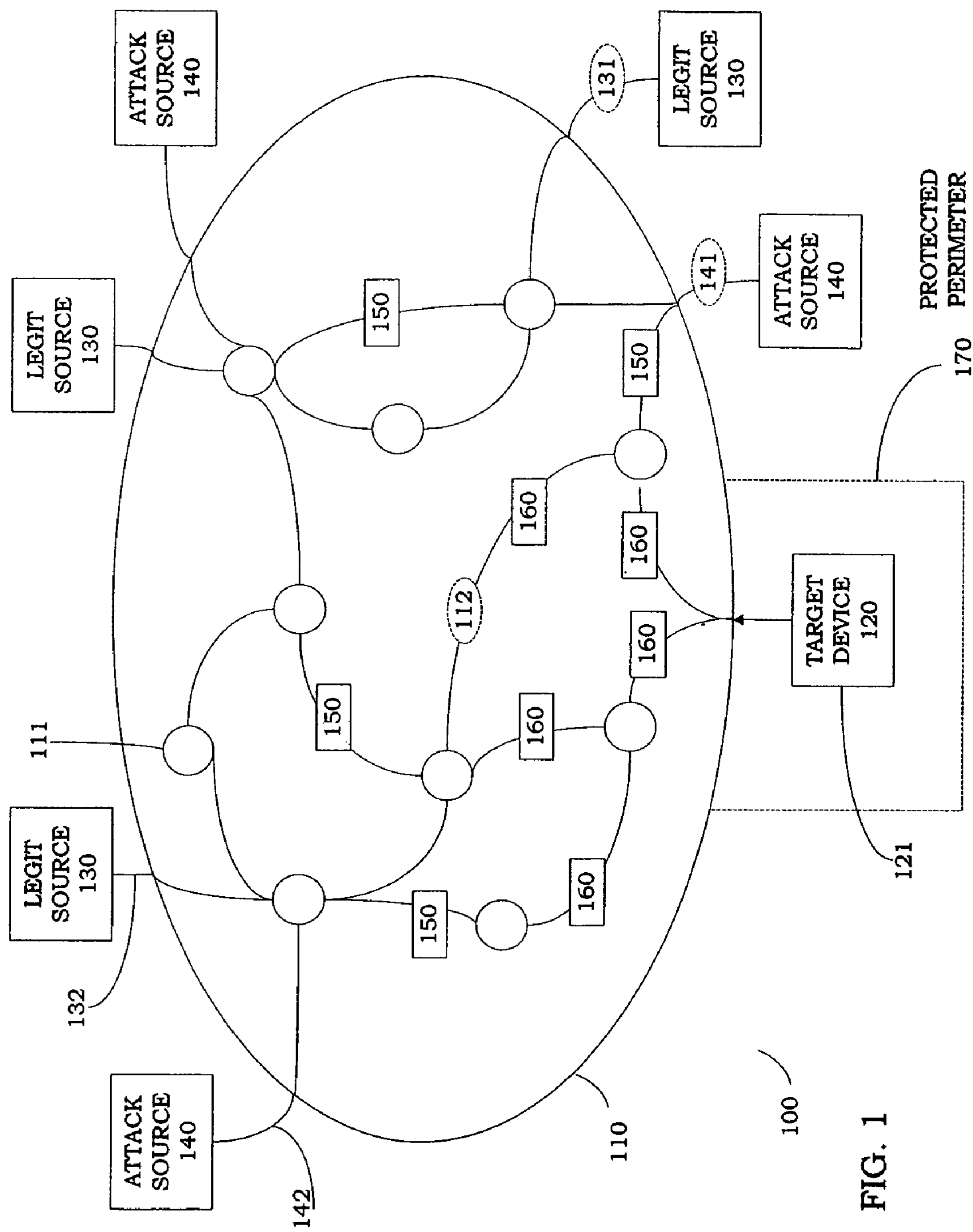
FIG. 1 shows a block diagram of a system including defenses against attacks in a distributed computing environment.

Preferred embodiments of the invention are described herein, including preferred device coupling, device functionality, and process steps. After reading this application, those skilled in the art would realize that embodiments of the invention might be implemented using a variety of other techniques not specifically described herein, without undue experimentation or further invention, and that such other techniques would be within the scope and spirit of the invention.

DEFINITIONS

The general meaning of each of these terms is intended to be illustrative and in no way limiting.

- The terms "message", "traffic", and the like, generally refer to information communicated in a communication network, such as for example a packet-switched network like the internet.
- Generally, the term "message", and the like, generally refers to a single datagram or other distinct data object, while the term "traffic", and the like, generally refers to a set of messages. In the context of the invention, there is no particular requirement that traffic involves more than one message, or even any messages, and there is no particular requirement that traffic involves more than one sender or more than one recipient.
- The phrase "attack traffic", and the like, generally refers to traffic intended or having the effect of degrading the performance or reliability, or other useful qualities of the attack target.
- The phrase "legitimate traffic", and the like, generally refers to traffic that is intended for the legitimate purposes of the sender and recipient, such as for exampie, electronic commercial transactions. Generally, the nature of attack traffic within a taxonomy thereof is sometimes called an "attack pattern".

The phrase "outside-in", and the like, with regard to attack patterns, generally refers to attack traffic with the property that most of the messages in the attack traffic are from the "outside" of an enterprise network (or other protected perimeter), directed into or through the protected perimeter.

In contrast, the phrase "inside-out", and the like, with regard to attack patterns, generally refers to attack traffic with the property that most of the messages in the attack traffic are from the "inside" of a protected perimeter, directed to other devices within that perimeter or directed to devices outside that perimeter.

Although embodiments of the invention are described herein with regard to "outside-in" and "inside-out" attack patterns, those embodiments might also handle "inside-inside" (from one node inside the protected perimeter to another node inside the protected perimeter) and "outside-outside" (from one node outside the protected perimeter to another node outside the protected perimeter, and having an effect on the target device) attack patterns. In the context of the invention, there is no reason to restrict operation to exclude any particular type of attack pattern.

The phrase "enterprise network", and the like, generally refers to a network administered from a substantially uniform authority, such as a campus-wide network in a university or corporate campus, or such as a network coupling more wide-ranging devices in a corporate or other cooperative venture. In the context of the invention, there is no particular requirement that an enterprise network use any particular protocol or have any particular administration or security policies.

The phrase "protected perimeter", and the like, generally refers to a portion of a network intended to be protected against attack traffic. For example, a protected perimeter might include an enterprise network, or might include only a designated portion of that enterprise network such as the finance and accounting elements of an enterprise. In the context of the invention, there is no particular requirement that a protected perimeter is controlled by a single entity, with the effect that multiple entities, such as for example universities and corporate research centers, might cooperate to provide a protected perimeter.

Terms and phrases relating to distance between devices, such as "closer", "further", "upstream", "downstream", and the like, generally refer to distance across a network topology, such as for example hop count or time to send a message from one device to another. In the context of the invention, there is no particular requirement that distances between devices are in any way correlated with physical distance.

The scope and spirit of the invention is not limited to any of these definitions, or to specific examples mentioned therein, but is intended to include the most general concepts embodied by these and other terms.

System Overview

As described herein, attack traffic generally differs in kind from legitimate traffic. Types of attack traffic include all messages directed at a destination device (sometimes herein called a "target device"). In addition to the most general case, any attack traffic which has a deleterious effect on the target device, attack traffic includes at least three types:

(1) One type of attack includes DOS ("denial of service") attacks and DDOS ("distributed denial of service") attacks, in which the attacker intends to degrade the target device by flooding the target device with an unusually large number of incoming messages. Often the target device is effectively brought to a halt by processing the attack traffic.

In a DOS attack, one (or a very few) source devices send a very large number of messages to the target device. Often, these messages have their source addresses "spoofed", that is, faked to indicate a source other than the actual source device.

In a DDOS attack, the number of source devices is substantially larger, and may also be more widely distributed across the network in which the attack is taking place. Again, often these messages have their source addresses "spoofed" to indicate sources other than the actual source devices.

(2) One type of attack includes worm attacks (sometimes known as "virus" attacks, such as when assisted by users), in which the attacker intends to hijack the target device and convert the target device into an instrument by which the attacker might continue to propagate the worm or virus. Again, the target device may be effectively brought to a halt by processing the attack traffic, but more importantly, the number of messages carrying the worm message payload increases greatly with time, as additional target devices are hijacked and converted to propagators of the worm message payload.

(3) One type of attack includes "spam" (unsolicited and unwanted messages, typically e-mail), in which the attacker intends to deliver the message payload to a very large number of users. It sometimes occurs that the impact on the target device itself is not anywhere as large as in other types of attack. However, the impact on users at the target device is more pernicious and more substantial. Users at the target device, receiving so many unsolicited and unwanted messages, generally expend effort, energy, and time, to examine those incoming messages, to determine whether they are in fact worth reading. This problem is compounded by the danger of falsely marking a useful message as spam, which has the effect of preventing that useful message from arriving at, and being read by, the user.

(4) As noted herein, DOS and DDOS attacks, and spam attacks, may reasonably be classified as "outside-in" attack traffic. These types of attacks generally include relatively large numbers of messages directed at the target device from outside a protected perimeter, such as an enterprise network or an individual secure device.

"Worm" attacks may reasonably be classified as "inside-out" (or "inside-inside") attack traffic. These types of attacks generally include relatively large numbers of messages generated from inside a protected perimeter, such as an enterprise network, due to one or more of the target devices within that protected perimeter being infected with the worm message payload.

However, after reading this application, those of ordinary skill in the art will recognize that there may exist a vast number of alternative types of attack traffic, against which the principles described herein might be applied.

Target Devices

A set of embodiments described herein refers to target devices as performing their own detection of suspected attack traffic. However, more precisely, in preferred embodiments, the actual detection is performed by a detection device, coupled to the target device, and sniffing traffic to the target device. This has the effect that the detection device enhances the target device. Accordingly, references to the target device performing operations related to the invention are equally well performed, and preferably performed, by such a detection device.

A target device (more precisely, a detection device coupled to that target device) possibly receiving an outside-in attack, or a device near the target device, can detect outside-in attacks, in response to unusual amounts of load placed on the target device, or in response to unusual traffic patterns. (1) For example, a target device with an expected amount of load, which suddenly receives an unexpectedly large amount of load from incoming messages, might suspect attack traffic. (2) For example, a target device with an expected pattern of incoming messages, primarily from ".edu" domains, which suddenly receives an unexpectedly large number of incoming messages from ".co.uk" domains, might suspect attack traffic.

Outside-in attacks have the property of placing extra load on the target device, or on users of that target device. This has the effect that attack traffic directed at a particular target device consumes resources otherwise available at that target device. For example, consuming those resources might have one or more of the following effects:

- The ability of the target device to respond to other incoming messages might be degraded. In a classic DOS ("denial of service") attack, or in an more sophisticated DDOS ("distributed denial of service") attack, the attackers flood the target device with so many messages that the target device is effectively brought to a halt by processing the attack traffic.
- The ability of the target device to respond to commands from its users might be degraded. Similar to the DOS or DDOS attack, the attackers flood the target device with so many messages that the target device has few resources, such as computation cycles, to devote to receiving requests from users and responding to those requests by performing tasks as directed by those users.
- The ability of the target device to examine incoming messages might be degraded. The target device might include hardware or software whose purpose is to prevent maleficent message payloads, such as for example software viruses, from compromising the security of the target device. When attackers flood the target device with enough messages, it might occur that the target device becomes unable to adequately assure that such undesirable message payloads are rejected.
- The ability of users at the target device to direct their effort, energy, and time to other, more productive incoming messages might be degraded. For example, users receiving a relatively large number of unwanted messages (spam), wade through their e-mail removing those unwanted messages and attempting to assure themselves that they have not lost any messages of consequence. This might be so in one or more of the following cases: (1) in a classic spam attack, (2) in a more sophisticated distributed spam attack, or (3) in a still more sophisticated attempt to hijack the target device to convert it to a zombie spam generator.

Corroborating Devices

A suspected set of attack traffic can be determined to be more likely to be attack traffic at a corroborating device, at a network location upstream from the target device or otherwise closer to the sending device. As noted herein, attack traffic generally has few origination points, that is, only one or a few senders create and can be attack traffic to the target device. In contrast, legitimate traffic generally has many more origination points.

This has the effect that corroborating devices at network locations closer to the sending device have a different view of the nature of the incoming traffic, and can coordinate with the (enhanced) target device (that is, with the detection device coupled thereto), or with other corroborating devices, to more accurately determine if the incoming traffic is attack traffic or legitimate traffic. For example, corroborating devices might be responsive to one or more of the following factors:

- Once notified of suspected attack traffic by the target device or its detection device, corroborating devices might be responsive to "unusually elevated" traffic, or to traffic from "unusual" origination points, as determined by the source addresses in the messages. In such cases, the target device might inform corroborating devices what its legitimate traffic generally is like, and the degree to which that legitimate traffic varies from day-to-day and from hour to hour. Similarly, the target device might inform corroborating devices which sources legitimate traffic generally comes from, and the degree to which that legitimate traffic is disbursed over a variety of source addresses. For example, if the target device is web site at which books are sold, the target device might inform corroborating devices of its peak and trough traffic hours and days, and of its most common repeat customers. When incoming traffic differs substantially from expected, corroborating devices might be more likely to conclude that incoming traffic is attack traffic rather than legitimate traffic.
- Although this application describes corroboration devices as operating at the prompting of target devices, in the context of the invention, there is no reason for embodiments of the invention to be so restricted. Corroboration devices might operate on their own initiative, such as when they too detect suspect attack traffic, might operate on prompting from other corroborating devices, or might operate at the prompting of mitigating devices.
- Corroborating devices might be responsive to a degree by which incoming traffic bifurcates, or otherwise divides, at each incoming transition node in the network. Attack traffic in a classic DOS attack originates at only a few sources, with the effect that there are only a limited number of network paths between the originator of the attack traffic and the target device. Legitimate traffic generally originates at a much larger number of sources, and these much larger number of sources are generally distributed more evenly throughout the network. This has the effect that there are relatively many more network paths from senders of legitimate traffic to the target device than from an originator of attack traffic and the target device. When incoming traffic does not bifurcate or otherwise divide significantly (or equivalently, when incoming traffic bifurcates or otherwise divides in a skewed manner) with distance from the target device, corroborating devices might be more likely to conclude that incoming traffic is attack traffic rather than legitimate traffic.
- This technique takes advantage of a manner of operation for routing networks, that is, their routing is destination driven. However, in the context of the invention, there is no requirement for operating only with routing networks. For example, other types of networks might have properties which allow corroborating devices to determine, from their substantially position in the network, that suspect attack traffic, with multiple alleged sources, is in fact originating from only a very few sources.

Additional analysis is also possible. Corroborating devices might examine message payloads as well as the number and "direction" of those incoming messages. In current implementations of computer networks coupled to the Internet, messages generally indicate their source address, destination address, protocol type, port number at the destination address, message size, and other information capable of analysis. For example, corroborating devices might be responsive to one or more of the following factors:

- Corroborating devices might attempt to analyze source addresses of incoming messages, with the effect of determining whether the source address has been "spoofed", that is, faked. For example, the source address might be deemed to be spoofed when it indicates an originating device relatively distant from the routing node from which the corroborating device receives that message. Moreover, some source addresses, even if not spoofed, have historically been associated with attack traffic, such as spam email. And a source address, whether spoofed or not, might be deemed dangerous if the frequency of messages from that source address is substantially higher than would be expected with legitimate traffic. When features of incoming messages indicate that the originating device is likely to be inauspicious, corroborating devices might be more likely to conclude that incoming traffic is attack traffic rather than legitimate traffic.
- In a reverse of attempting to determine if the source address is dangerous, corroborating devices might maintain a list of those source devices which the corroborating device considers trusted, much like a white list in a spam filter, from its experiences in the absence of any suspect attack traffic. Corroborating devices would attempt to determine if any change in circumstance occurs, leading to a probability of belief that the trusted source device has been hijacked by software that now generates attack traffic. Corroborating devices might be more likely or less likely to conclude that incoming traffic including those messages is attack traffic rather than legitimate traffic, depending upon determinations at corroborating devices whether such a change in circumstance has occurred.
- Corroborating devices might attempt to analyze other features of incoming messages, as described herein. For example, incoming messages might be deemed to be malicious if there is a mismatch between any two of their: protocol type, target port number, or message size. This might include HTTP protocol messages directed to non-HTTP port numbers, IM ("instant message") protocol messages directed to non-IM port numbers, or text messaging with unusually large payloads, or with message payloads not easily corresponding to a known text encoding. When features of incoming messages indicate that the messages themselves are likely to be maleficent, corroborating devices might be more likely to conclude that incoming traffic including those messages is attack traffic rather than legitimate traffic.

Additional analysis is also possible. Corroborating devices might maintain a set of processing rules for examining incoming messages and determining whether those incoming messages are likely to be part of attack traffic or legitimate traffic. These rules might include multi-rule analysis and inferences drawn from various clues. Moreover, these rules might operate like ACL's (access control lists), as used by router nodes in the network itself.

- In a first aspect of such embodiments, corroborating devices might start with an initial set of processing rules (possibly an empty set), and receive additions, changes, or deletions with regard to those rules from target devices.
- In a second aspect of such embodiments, corroborating devices might start with an initial set of processing rules (again, possibly an empty set), and modify those rules in response to feedback from target devices, or feedback from users at target devices.
- In a third aspect of such embodiments, corroborating devices might start with an initial set of processing rules (again, possibly an empty set), and after modifying those rules as directed or discovered, share the modified rules with other corroborating devices.

This would have the effect that corroborating devices could adaptively focus on rules that substantially reduced attack traffic arriving at the target device, while leaving legitimate traffic substantially untouched.

Mitigating Devices

A set of mitigating devices might prevent attack traffic from reaching the target device, using information from the target device and corroborating devices. In one set of embodiments, corroborating devices and mitigating devices might be collocated on the same hardware, with the effect of being able to share information easily and quickly. As noted herein, corroborating devices are well-disposed to determine if messages are attack traffic or legitimate traffic. Accordingly, mitigating devices using information from the target device and corroborating devices are well disposed to substantially filter out attack traffic from reaching the target device, while leaving legitimate traffic substantially untouched.

In preferred embodiments, mitigating devices use filters similar to corroborating devices, with the effect that mitigating devices are disposed as well as corroborating devices to determine whether messages are attack traffic or legitimate traffic. In such preferred embodiments, mitigating devices obtain their filters from corroborating devices, with the effect that target devices, corroborating devices, and mitigating devices, all cooperate to determine which messages are likely to be attack traffic and to remove those messages from traffic reaching the target device.

As mitigating devices actually remove messages from traffic reaching the target device, they are most useful when traffic reaching the target device is relatively high, and least necessary when traffic reaching the target price is relatively low. Accordingly, mitigating devices might additionally have rules determining when they actually remove messages from traffic reaching the target device.

- In a first aspect of such embodiments, mitigating devices might start with an initial set of processing rules (possibly an empty set), and receive additions, changes, or deletions with regard to those rules from target devices. Mitigating devices might also modify those rules in response to feedback from target devices or corroborating devices, or feedback from users at target devices or administrators at corroborating devices. Mitigating devices might also share the rules they receive or discover with other mitigating devices. In his latter instance, corroborating devices and mitigating devices might share rules freely without regard for the particular role each device is used for.
- In a second aspect of such embodiments, corroborating devices and mitigating devices might, from time to time, be reassigned from one role to another. This would have the effect that the number of corroborating devices might be responsive to the number of corroborating devices deemed necessary or useful by the target device, or by an administrator. The number of mitigating devices might also be responsive to the number of mitigating devices deemed necessary or useful by the target device, or by an administrator. The relative allocation of corroborating devices and mitigating devices might be responsive to one or more of the following factors:

(1) The amount of effort desired for determining whether messages are part of attack traffic or legitimate traffic.

(2) The amount of effort desired for removing messages from traffic reaching the target device.

(3) The number of devices desired for allocation in a particular "direction" of messages incoming to the target device.

Protected Perimeter

As described herein, the set of corroborating devices and mitigating devices might collectively form a perimeter "around" the target device, and other such target devices within a protected perimeter, such as for example an enterprise network.

As the point of examination in a network moves (virtually) away from the target device and toward one or more source devices of the attack traffic, the amount of information obtained by corroborating devices, and the effect able to be exercised by mitigating devices, is substantially increased. This is true due to one or more of the following factors:

As noted herein, the "direction" of attack traffic might be set by the relative location of the source devices (originating the attack traffic) relative to the target device. This has the effect that, in a network having routing nodes, those corroborating devices and mitigating devices in the "direction" of the attack traffic use relatively more resources, while those corroborating devices and mitigating devices in other directions do not. With this effect, the target device, corroborating devices, and mitigating devices, have substantially more information regarding the nature and source of the attack traffic, and regarding how to reduce its effect upon the target device.

This effect is seen even when the network is itself an intranet (rather than the Internet), and is itself substantially or entirely within an enterprise network or a network maintained by an ISP. At each conjunction of routing nodes within the intranet, one or more intranet defenses, such as for example "firewall" devices, effectively collaborate. This has the effect that the ability of any attack traffic, or any message including a dangerous payload, to penetrate multiple conjunctions of routing nodes is severely attenuated.

In one set of preferred embodiments, the set of corroborating devices and mitigating devices is scalable with the use of multiple devices. First, multiple such devices can distribute the load due to incoming message traffic. Second, when there are M corroborating devices and N mitigating devices, the system of (M+N) total devices generally operates more effectively than linearly with (M+N). This is due to the nature of the network traffic, in that the amount of message traffic is likely to be nonuniform in distribution. This has the effect that there are likely to be regions of the network where legitimate traffic predominates, and there are likely to be regions of the network where attack traffic is more common than otherwise.

"Inside-Out" Attacks

As described herein, one type of attack traffic includes messages originating from within the protected perimeter, often due to one or more target devices within the protected perimeter having been hijacked by a worm message payload. "Worm" attack traffic generally grows quite quickly as more and more target devices become infected with the worm message payload. While it is possible to prevent infection by the worm message payload at the target device, this is typically best done with information about the worm message payload, sometimes called a worm "signature" used by a virus-checking software and other system security techniques.

Once worm attack traffic has infected a target device within the protected perimeter, that target device will be induced by the worm message payload to send further worm attack traffic to additional target devices. Often, these additional target devices will also be within the protected perimeter. However, unlike "outside-in" attack traffic, system security techniques can determine the actual (as opposed to "spoofed") sender address of the originating device. This has several advantageous effects: (1) Worm attack traffic can be detected in real-time. (2) Worm message payload signatures can be calculated in real-time and propagated to anti-worm filters and other system security techniques. (3) Use of multiple worm attack traffic detectors generally protects many more devices than linear scaling in the number of attack traffic detectors.

System Elements

FIG. 1 shows a block diagram of a system including defenses against 3 software attacks in a distributed computing environment.

A system 100 includes elements as described herein, plus possibly other elements as shown in the figure or described in the incorporated disclosure. The system 100 includes at least a communication network 110, a set of target devices 120, a set of legitimate traffic sources 130 and a set of attack traffic sources 140, and a set of corroborating devices 150 and a set of mitigating devices 160 disposed near a protected perimeter 170.

The communication network 110 also includes elements as described herein, plus possibly other elements as shown in the figure or described in the incorporated disclosure. The communication network 110 includes at least a set of internal routing nodes 111, and traffic including messages 112 in transit, which might be part of legitimate traffic 131 or attack traffic 141.

Each target device 120 also includes elements as described herein, plus possibly other elements as shown in the figure or described in the incorporated disclosure. Each target device 120 includes at least one port 121 coupling the target device 120 to the communication network 110, and addressable by messages 112 as their destination port 121. Each target device 120 also includes a processor with program and data memory, disposed to perform method steps as described herein.

The legitimate traffic sources 130 also include elements as described herein, plus possibly other elements as shown in the figure or described in the incorporated disclosure. The legitimate traffic sources 130 are coupled to the communication network 110 using at least one port 132, in a manner similar to the target devices 120 and their ports 121. The legitimate traffic sources 130 or disposed to generate legitimate traffic 131, including messages 112 forming part of that legitimate traffic 131. Each legitimate traffic source 130 also includes a processor with program and data memory, as described herein.

The attack traffic sources 140 also include elements as described herein, plus possibly other elements as shown in the figure or described in the incorporated disclosure. The attack traffic sources 140 are coupled to the communication network **11*o* using at least one port 142, in a manner similar to the target devices 120 and their ports 121. The attack traffic sources 140 or disposed to generate attack traffic 141, including messages 112 forming part of that attack traffic 141. Each attack traffic source 140** also includes a processor with program and data memory, as described herein.

The corroborating devices 150 also include elements as described herein, plus possibly other elements as shown in the figure or described in the incorporated disclosure. The corroborating devices 150 or disposed near a protected perimeter 170, which is itself disposed to protect at least one target device 120 from attack traffic 141. Each particular corroborating device 150 also includes a processor with program and data memory, as described herein, and a communication link 151 between that particular corroborating device 150 and at least one target device 120, or among that particular corroborating device 150 and other corroborating devices 150 or mitigating devices 160.

The mitigating devices 160 also include elements as described herein, plus possibly other elements as shown in the figure or described in the incorporated disclosure. The mitigating devices 160 or disposed near a protected perimeter 170, which is itself disposed to protect at least one target device 120 from attack traffic 141. Each particular mitigating device 160 also includes a processor with program and data memory, as described herein, and a communication link 161 between that particular mitigating device 160 and at least one target device 120, or among that particular mitigating device 160 and other mitigating devices 160 or corroborating devices 150.

The protected perimeter 170 designates a region of the communication network 110 intended to be protected against attack traffic 141. In one set of preferred embodiments, the protected perimeter 170 might enclose an enterprise network, or a subdivision thereof such as an individual LAN or WAN, or a particular department or device. As described herein, the corroborating devices 150 and the mitigating devices 160 are disposed to prevent, to the degree possible, attack traffic 141 from entering the protected perimeter 170. Moreover, the corroborating devices 150 and mitigating devices 160 are disposed to detect and remove, to the degree possible, attack traffic 141 emanating from inside the protected perimeter 170.

Method of Operation

Figure 2:
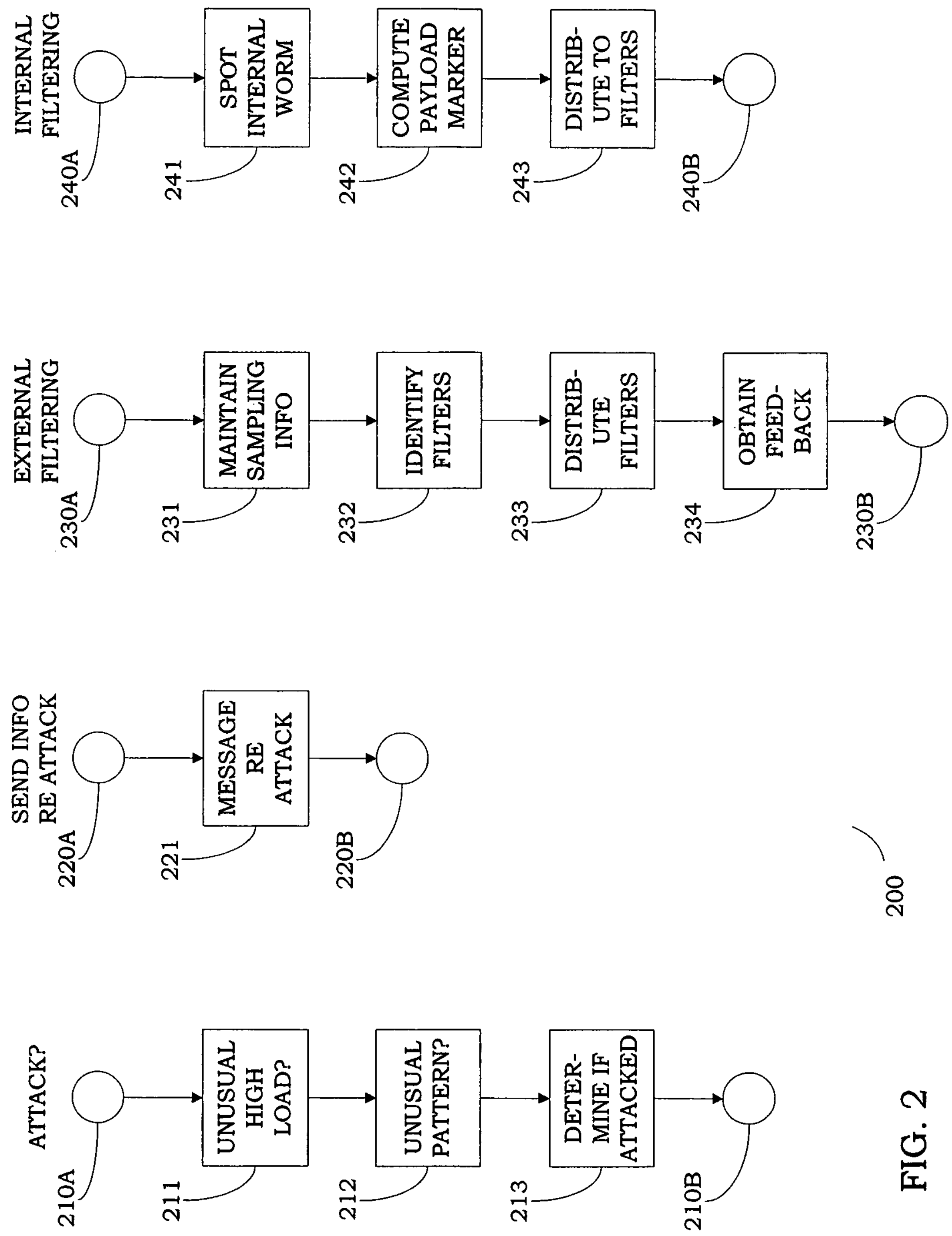
FIG. 2 shows a process flow diagram of a method of operating a system including defenses against attacks in a distributed computing environment.

FIG. 2 shows a process flow diagram of a method of operating a system including defenses against software attacks in a distributed computing environment.

A method 200 includes a set of flow points and steps. Although described serially, these flow points and steps of the method 200 can be performed by separate elements in conjunction or in parallel, whether asynchronously or synchronously, in a pipelined manner, or otherwise. There is no particular requirement that the flow points or steps are performed in the same order as described, except where explicitly said so.

The method 200 includes flow points and process steps as shown in FIG. 2, plus possibly other flow points and process steps as described in the incorporated disclosure. These flow points and process steps include at least the following.

- A pair of flow points 210A to 210B, and a set of steps performed there-between, in which a target device 120 attempts to determine if it is the subject of attack traffic 141.
- A pair of flow points 220A to 220B, and a set of steps performed there-between, in which the target device 120 sends information regarding suspected attack traffic 141 to corroborating devices 150 and mitigating device is 160 near a protected perimeter 170.
- A pair of flow points 230A to 230B, and a set of steps performed there-between, in which the method 200 develops filters to distinguish attack traffic 141 from legitimate traffic 131, and distributes those filters as appropriate.
- A pair of flow points 240A to 240B, and a set of steps performed there-between, in which the method 200 attempts to develop and deploy early worm message payload detectors, with the effect of distinguishing worm messages 112 from legitimate traffic 131.

Detecting Attack Traffic

At a flow point 210A, an (enhanced) target device 120, that is, a target device 120 with a detection device, attempts to determine if it is the subject of attack traffic 141.

At a step 211, the target device 120 determines if it is receiving an unusually high amount of load from current incoming messages 112. To perform this step, the target device 120 performs the following sub-steps:

- At a sub-step 211 (*a*), the target device 120 continuously maintains a "usual" amount of load from current incoming messages 112.
- At a sub-step 211 (*b*), the target device 120 measures an amount of load from current incoming messages 112.
- At a sub-step 211 (*c*), the target device 120 compares a result of the earlier sub-step 211 (*a*) and the earlier sub-step 211 (*b*), with the effect of comparing the "usual" amount of load with the "current" amount of load from incoming messages 112.
- At a sub-step 211 (*d*), the target device 120 determines if it is receiving an unusually high amount of load from current incoming messages 112, in response to a result of the earlier sub-step 211 (*c*).
- If the current amount of load exceeds the usual amount of load, the target device 120 determines that is in fact receiving an unusually by amount of load from current incoming messages 112.
- If the current amount of load does not exceed the usual amount of load, the target device 120 determines that is not receiving an unusually by amount of load from current incoming messages 112.

At a step 212, the target device 120 determines if it is receiving an unusual pattern of the incoming message traffic. To perform this step, the target device 120 performs the following sub-steps:

- At a sub-step 212 (*a*), the target device 120 continuously maintains a "usual" pattern of current incoming messages 112. In one set of preferred embodiments, the pattern of current incoming messages 112 is responsive to a set of source addresses gleaned from those messages 112.
- At a sub-step 212 (*b*), the target device 120 examines a pattern of current incoming messages 112, using a technique similar to that of the earlier sub-step 212 (*a*).
- At a sub-step 212 (*c*), the target device 120 compares a result of the earlier substep 212 (*a*) and the earlier substep 212 (*b*), with the effect of comparing the "usual" pattern of messages 112 with the "current" pattern of messages 112.
- At a sub-step 212 (*d*), the target device 120 determines if it is receiving an unusual pattern of incoming messages 112, in response to a result of the earlier sub-step 212 (*c*).
- If the current pattern of incoming messages 112 is sufficiently different from the usual pattern of incoming messages 112, the target device 120 determines that is in fact receiving an unusual pattern of incoming messages 112.

At a step 213, the target device 120 determines, in response to results of the earlier step 211 and the earlier step numeral 212, if it is likely to be receiving attack traffic 141.

At a flow point 210B, a target device 120 has completed its determination whether it is the subject of attack traffic 141. In one set of preferred embodiments, the method 200 continues with the flow point 210A, with the effect that the target device 120 vigilantly maintains a watch for incoming attack traffic 141.

After reading this application, those skilled in the art will recognize that the portion of the method 200 described by the flow points 210A and 210B, and the steps described therebetween, need not necessarily be performed by the target device 120. In the context of the invention, there is no particular requirement that the target device 120 is the device, or the only device, to perform those steps. In one set of preferred embodiments, the portion of the method 200 described by the flow points 210A and 210B, and the steps described therebetween, might be performed by a separate security device coupled to the target device 120, or might be performed by such as security device in combination or conjunction with the target device 120.

Confirming Attack Traffic

At a flow point 220A, a target device 120 sends information regarding suspected attack traffic 141 to corroborating devices 150 and mitigating devices 160 near a protected perimeter 170.

At a step 221, the target device 120 prepares a message 112 for corroborating devices 150 and mitigating devices 160 near a protected perimeter 170. In a first set of preferred embodiments, the message 112 describes the nature of the attack traffic 141. In a second set of preferred embodiments, in which one or more of the corroborating devices 150 or mitigating devices 160 is coupled directly to the target device 120, the message 112 might be presented to them by a technique other than use of the communication network 110. For example, in embodiments where the target device 120 and a corroborating device 150 or a mitigating device 160 are collocated in a single device, or in a cluster of devices sharing memory, the target device 120 might write the message number 112 into a shared memory buffer for review by that collocated device.

At a flow point 220B, the target device 120 has completed sending information regarding suspected attack traffic 141 to corroborating devices 150 and mitigating devices 160. In one set of preferred embodiments, the method 200 continues with the flow point 220B, with the effect that the target device 120 sends such information from time to time to those devices.

Filtering External Attack Traffic

At a flow point 230A, the method 200 attempts to develop filters to distinguish attack traffic 141 from legitimate traffic 131, and distributes those filters as appropriate.

At a step 231, the method 200, being performed either at one or more target devices 120, one or more corroborating devices 150, or one or more mitigating devices 160, continuously maintains sample information regarding legitimate traffic 131 and attack traffic 141. In one set of preferred embodiments, the sample information includes those aspects of messages 112 recognizable by the method 200, such as for example message headers, protocol and port numbers, message size, and message trying and frequency.

At a step 232, the method 200 attempts to identify one or more filters distinguishing the sample information it maintains regarding legitimate traffic 131 and attack traffic 141. In one set of preferred embodiments, the identified filters might include one or more attempts to cluster legitimate traffic 131, using those aspects of messages 112 recognizable by the method 200, as described in the earlier step 231. Similarly, the identify filters might include one or more attempts to cluster attack traffic 141, using those aspects of messages 112 recognizable by the method 200.

At a step 233, the method 200 distributes those one or more filters among target devices 120, corroborating devices 150, and mitigating devices 160, to the extent possible.

At a step 234, the method 200 attempts to identify feedback regarding those one more filters from those devices to which those filters were distributed. In one set of preferred embodiments, the method 200 attempts to use that feedback to alter (adaptively or otherwise) those one or more filters, with the effect that those one or more filters become more effective.

At a flow point 230B, the method 200 has developed filters to distinguish attack traffic 141 from legitimate traffic 131, and has distributed and updated those filters as appropriate. In one set of preferred embodiments, the method 200 continues with the flow point 230B, with the effect that those devices receiving distributed filters are capable of maintaining updated versions of those filters.

Filtering Internal Attack Traffic

At a flow point 240A, the method 200 attempts to develop and deploy early worm message payload detectors, with the effect of distinguishing worm messages 112 from legitimate traffic 131.

At a step 241, the method 200 recognizes traffic including messages 112 originating from inside the protected perimeter 170, for which the method 200 identifies those messages 112 as being part of attack traffic 141. In one set of preferred embodiments, for example, the method 200 can recognize those messages 112 originating from inside the protected perimeter 170 as being part of attack traffic 141 if their source addresses are “spoofed”. For messages 112 originating from inside the protected perimeter 170, the method 200 can recognize the correct source address for the message 112, with the effect that the method 200 can recognize when those messages 112 have spoofed source addresses.

At a step 242, the method 200 calculates a worm payload signature for messages 112 which the method 200 identifies as being part of worm attack traffic 141.

At a step 243, the method 200 distributes results of the earlier step 242, including worm payload signatures, to worm message filters both within and outside the protected perimeter 170. In one set of preferred embodiments, for example, the method 200 might register each new worm payload signature when a public repository of known worm payload signatures.

At a flow point 240B, the method 200 has developed and deployed early worm message payload detectors, with the effect of distinguishing worm messages 112 from legitimate traffic number 131. In one set of preferred embodiments, the method 200 continues with the flow point 240B, with the effect that worm messages 112 entering the protected perimeter 170 are rapidly detected and have tailored filters developed and deployed capable of detecting those worm messages 112.

ALTERNATIVE EMBODIMENTS

Although preferred embodiments are disclosed herein, many variations are possible which remain within the concept, scope, and spirit of the invention. These variations would become clear to those skilled in the art after perusal of this application.

For one example, to apply the concepts and techniques of the invention to spam attacks, the concepts and techniques of the invention might be applies at a high-level of transport, such as for example messages instead of packets, sender instead of SRC addresses and recipients instead of destination addresses and SMTP instead of IP.

SPAM is like a worm attack, in that it is one-to-many, and is like a DDOS attack in that it is outside-in. Effectively, a spam is detected when a "source" sends an unusual amount of messages to a set of unusual destinations. While it is best to detect the attack close to its origin, it can be detected downstream near pools of recipients such as enterprises and email-providers.

After reading this application, those skilled in the art will recognize that these alternative embodiments and variations are illustrative and are intended to be in no way limiting. After reading this application, those skilled in the art would recognize that the techniques described herein provide an enabling technology, with the effect that advantageous features can be provided that heretofore were substantially infeasible.

The invention claimed is:

1. A method, including steps of:

operating a first computing device coupled to a distributed computing environment;

maintaining a record of a first pattern of legitimate message traffic;

comparing a pattern of current message traffic received at the first computing device to said record of the first pattern of legitimate message traffic; and taking action in response to said steps of comparing, including:

determining if the pattern of current message traffic includes attack traffic;

operating a second computing device coupled to said distributed computing environment and disposed to receive messages from said first computing device to ameliorate said attack traffic;

wherein the steps of taking action to ameliorate the attack traffic include steps of:

sending information regarding said pattern of current message traffic to a logically distinct location in a network;

comparing said information to a second pattern of message traffic at the logically distinct location; and determining if the second pattern of message traffic at the logically distinct location includes attack traffic and ameliorating the attack traffic.

2. The method as in claim 1, wherein the pattern of legitimate messages includes a degree of resource usage based at least in part on response to a measure of time.

3. The method as in claim 1, wherein the pattern of legitimate messages includes a degree of resource usage based at least in part on response to a set of selected source addresses.

4. The method as in claim 1, wherein the pattern of legitimate messages includes a set of trusted source addresses.

5. The method as in claim 1, wherein the steps of taking action include steps of:

sending information regarding said current pattern of message traffic to a logically distinct location in a network; and sharing said information among a plurality of such logically distinct locations.

6. The method as in claim 1, wherein the steps of taking action include steps of:

sharing information regarding the attack traffic among a plurality of logically distinct locations in a network; and cooperating among the logically distinct locations to filter message traffic based at least in part on the shared information.

7. The method as in claim 6, including steps of, when the attack traffic originates from a location within a protected perimeter, identifying messages associated with the attack traffic;

determining a message signature allowing other devices to identify messages associated with the attack traffic; and sending the message signature to a filter at a logically distinct location.

8. The method as in claim 6, wherein the steps of cooperating define a protected perimeter about a target device.

9. The method as in claim 1, wherein the steps of taking action include steps of:

sharing information regarding the attack traffic among a plurality of logically distinct locations in a network; and filtering message traffic at the logically distinct locations based at least in part on the shared information.

10. The method as in claim 9, including steps of, when that attack traffic originates from a location within a protected perimeter, identifying messages associated with the attack traffic;

determining a message signature allowing other devices to identify messages associated with the attack traffic; and sending the message signature to a filter at a logically distinct location.

11. The method as in claim 9, wherein the steps of cooperating define a protected perimeter about a target device.

* * * * *